Oct. 6, 1936.  H. M. KUHN  2,056,278

FABRIC BELTING SPLICE AND METHOD OF MAKING THE SAME

Filed March 7, 1935

INVENTOR.
HERBERT M. KUHN
BY
ATTORNEY.

Patented Oct. 6, 1936

2,056,278

UNITED STATES PATENT OFFICE 2,056,278

FABRIC BELTING SPLICE AND METHOD OF MAKING THE SAME

Herbert M. Kuhn, Clifton, N. J., assignor to United States Rubber Products, Inc., New York, N. Y., a corporation of Delaware Application March 7, 1935, Serial No. 9,712

12 Claims. (Cl. 24—38)

My invention relates to fabric belting, and more particularly to splices for belts comprising a plurality of layers of fabric, preferably rubber treated fabric, joined by stepped plies.

A type of fabric belt now in common use comprises a plurality of superimposed layers of woven fabric which are joined by stepped plies. The fabric layers or plies are usually treated with a material, such as rubber compounds, which causes them to stick together. The covering or top ply of the belt is likewise of woven fabric having its warp threads extending longitudinally of the belt and its weft threads crosswise of the belt so as to be relatively inextensible.

In such a belt the area of the stepped plies is apt to be slightly weaker and/or stiffer than the remainder of the belt so that there is a pronounced tendency for the top ply, which ordinarily extends over all of the inner stepped plies, to crack.

I propose to remedy this difficulty by interrupting the top ply in the spliced or stepper area and inserting a piece of bias cut fabric which extends over and slightly beyond the splices in the inner plies. As the inserted piece has the warp and weft threads at angles to the length of the belt, the top ply is relatively elastic in the spliced area and the tendency to crack is eliminated.

The accompanying drawing illustrates a present preferred embodiment of the invention, in which:—

Figure 1:
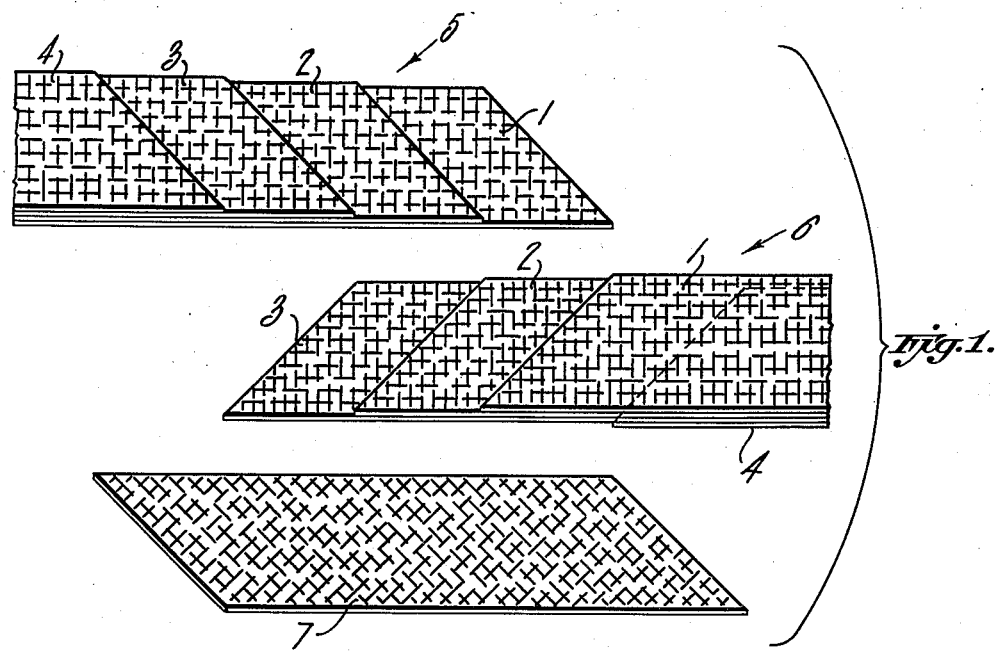
Figure 2:
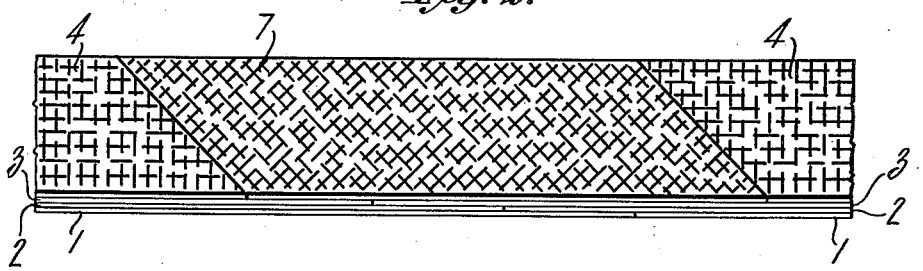

Fig. 1 is an exploded view of the end portions of a belt prior to forming a splice; and Fig. 2 is a plan view of a section of the belt after the splice or joint is completed.

Referring to the drawing, a belt comprises an inner or bottom ply 1, a second ply 2, a third ply 3, and a cover or top ply 4. The end sections 5 and 6 of the belt are brought together so that the ends of the several plies 1, 2, and 3 abut each other and overlap the adjacent plies; that is, the two ends of the ply 1 abut each other while the inner exposed portion of ply 1 in the section 5 is lapped over the exposed surface of the ply 2 in the end section 6. Similarly the end of ply 2 in the end section 5 is lapped on the exposed surface of the ply 3 in the end section 6 so that when the splice or joint is completed the ends of each ply abut each other and they occupy the same plane, thereby forming a splice of stepped plies. Various compositions may be used to secure a good bond at the splices. Various glues or mucilages may be employed, including rubber cements. A belt construction in common use is one in which the several plies have previously been treated with a rubber or rubber compound in an unvulcanized or tacky state and which can subsequently be vulcanized to provide a good bond. The present invention is not limited to any particular form of bond between the plies.

In order that the belt shall be relatively inextensible the plies 1, 2, 3, and 4 are usually made of square woven fabric with the warp threads extending lengthwise of the belt and the filler or weft threads extending crosswise. Preferably the ends of the plies are cut on the bias so that the splices in the several plies will extend diagonally across the belt.

Regardless of the care taken in making such splices the belt has a tendency to be slightly weaker and/or stiffer in the spliced area than elsewhere. As the outer or top ply 4 is of greater length than the inner plies when traveling around the circumference of a pulley in accordance with the thickness of the belt plies, there is an increase in the strain on the outer plies due to the fact that the outer radius of a belt in passing over a pulley is larger than the inner radius of the belt, making the outer ply or plies liable to cracking in the stepped area.

By terminating the ends of the square woven fabric 4 at an appreciable distance from each side of the splices caused by uniting the plies 1, 2, and 3 and filling the space with a piece of bias cut fabric 7 having its warp and weft threads extending at angles to the length of the belt, the top ply is rendered sufficiently extensible to accommodate itself to the variations in length and/or flexibility of the inner plies at the spliced area without cracking of the belt, and at the same time the other characteristics of the belt such as thickness and strength are not impaired.

It is to be understood that the invention is not limited to a four ply belt and that in a belt having a larger number of plies the bias cut insert could be incorporated in a plurality of outer plies.

The invention is particularly applicable to making endless belts wherein the end sections 5 and 6 are united by stepped plies so that the thickness and continuity of the belts remains substantially unchanged, however, the invention may be used in other types of belts.

While I have shown and described a present preferred embodiment of my invention and method of making the same, it is to be understood that the invention may be otherwise embodied and practiced without departing from the spirit of the invention and the scope of the appended claims.

Having now described my invention, what I claim and desire to protect by Letters Patent is:—

1. In the method of making a belt comprising a plurality of plies of inextensible fabric joined by stepped plies, the step comprising inserting a piece of extensible fabric in an outer ply of the belt at the stepped area.

2. In the method of making a belt comprising a plurality of superimposed plies of inextensible rubber treated fabric joined by stepped plies, the steps comprising interrupting the continuity of an outer ply of the belt and inserting a piece of bias cut fabric in the stepped area.

3. A fabric belt comprising a plurality of plies of relatively inextensible fabric joined by stepped plies and a piece of extensible fabric inserted in an outer ply and covering the joints in the inner plies.

4. A fabric belt comprising a plurality of plies of relatively inextensible fabric joined by stepped plies and a piece of bias cut fabric inserted in an outer ply and covering the joints in the inner plies.

5. A fabric belt comprising a plurality of inner plies of relatively inextensible rubber treated fabric joined by stepped plies, the outer or top ply being discontinuous and having a piece of bias cut rubber treated fabric inserted therein in the area over the splices in the inner plies to provide extensibility in the outer ply and prevent cracking.

6. A fabric belt comprising a plurality of inner plies of relatively inextensible rubber treated fabric joined by stepped plies, an outer ply being discontinuous and having a piece of bias cut rubber treated fabric inserted therein in the area over the splices in the inner plies to provide extensibility in the outer ply and prevent cracking.

7. An endless fabric belt comprising a plurality of inner plies of relatively inextensible rubber treated fabric joined by stepped plies, an outer ply being discontinuous and having a piece of bias cut rubber treated fabric inserted therein in the area over the splices in the inner plies to provide extensibility in the outer ply and prevent cracking.

8. In the method of making a splice in a belt comprising a plurality of plies of inextensible fabric, the steps comprising making a joint by stepping the inner plies of the belt and inserting a piece of extensible fabric in an outer ply of the belt over the stepped area of the inner plies.

9. In the method of making a splice in a belt comprising a plurality of superimposed plies of inextensible rubber treated fabric, the steps comprising stepping the inner plies of the belt to form a stepped splice in the belt and inserting a piece of a bias cut fabric in an outer ply of the belt over the stepped area of the inner plies.

10. A splice for a fabric belt having a plurality of layers of relatively inextensible fabric comprising a stepped joint formed in the inner plies of the belt and a piece of bias cut fabric inserted in an outer ply of the belt and covering the joints in the inner plies.

11. A splice for a fabric belt having a plurality of inner plies of relatively inextensible rubber treated fabric comprising a stepped joint formed by the inner plies and a piece of bias cut rubber treated fabric inserted in an outer ply over the area of the stepped joint in the inner plies to provide extensibility in the outer ply and prevent cracking.

12. A splice for a fabric belt having a plurality of inner plies of relatively inextensible rubber treated fabric comprising a stepped joint formed by the inner plies and a piece of bias cut rubber treated fabric inserted in the outer or top ply over the area of the stepped joint in the inner plies to provide extensibility in the outer or top ply and prevent cracking.

HERBERT M. KUHN.